United States Patent
Matsuba

(10) Patent No.: US 9,313,513 B2
(45) Date of Patent: Apr. 12, 2016

(54) DETECTION OF RESYNCHRONIZATION MARKERS WHEN DECODING AN MPEG-4 BITSTREAM

(75) Inventor: Yasutomo Matsuba, Tsukuba (JP)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 423 days.

(21) Appl. No.: 12/481,653

(22) Filed: Jun. 10, 2009

(65) Prior Publication Data

US 2010/0316133 A1    Dec. 16, 2010

(51) Int. Cl.
H04N 11/04 (2006.01)
H04N 19/20 (2014.01)
H04N 19/70 (2014.01)
H04N 19/44 (2014.01)
H04N 19/89 (2014.01)

(52) U.S. Cl.
CPC .............. *H04N 19/20* (2014.11); *H04N 19/44* (2014.11); *H04N 19/70* (2014.11); *H04N 19/89* (2014.11)

(58) Field of Classification Search
None
See application file for complete search history.

(56) References Cited

U.S. PATENT DOCUMENTS 6,959,046 B2    10/2005    Dufour et al.
7,627,042 B2 *  12/2009    Raman et al. ............ 375/240.27
2002/0021761 A1 *  2/2002  Zhang .................... H04N 19/89
                                               375/240.24
2004/0086050 A1 *  5/2004  Ye ........................ H04N 21/4143
                                               375/240.28
2004/0196905 A1 * 10/2004  Yamane ................. H04N 19/89
                                               375/240.12

OTHER PUBLICATIONS

Xuewen Ding et al., "Improved Error Detection and Localization Technique for MPEG-4 Video", 2006 8th International Conference on Signal Processing, (vol. 4), Nov. 2006.*

* cited by examiner

*Primary Examiner* — Frederick Bailey
(74) *Attorney, Agent, or Firm* — Michael A. Davis, Jr.; Frank D. Cimino

(57) ABSTRACT

A method for detecting a resynchronization marker in an encoded MPEG-4 video bitstream is provided that includes computing a first candidate resynchronization marker length based on a first version of MPEG-4 Visual and the type of a video object plane (VOP) in the video bitstream, computing a second candidate resynchronization marker length based on a second version of MPEG-4 Visual and the type of the VOP, checking the video bitstream for a first valid resynchronization marker bit sequence using the first candidate resynchronization marker length, checking the video bitstream for a second valid resynchronization marker bit sequence using the second candidate resynchronization marker length, and detecting the resynchronization marker when a valid sequence of stuffing bits is present in the video bitstream after the macroblock boundary and either the first valid resynchronization marker bit sequence or the second valid resynchronization marker bit sequence is found in the video bitstream.

12 Claims, 4 Drawing Sheets

DETECTION OF RESYNCHRONIZATION MARKERS WHEN DECODING AN MPEG-4 BITSTREAM

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, video jukeboxes, high-end displays and personal video recorders). In addition, new applications are in design or early deployment. Further, video applications are becoming increasingly mobile and converged as a result of higher computation power in handsets, advances in battery technology, and high-speed wireless connectivity.

Video compression/decompression for transmission and storage of digital video is an essential enabler for digital video products. MPEG-4, an ISO/IEC standard developed by the Moving Picture Experts Group (MPEG), is one industry standard for video compression used in many digital video products. One part of the MPEG-4 standard, ISO/IEC 14496-2 entitled "Generic Coding of Audio-Visual Objects. Part 2: Visual" (MPEG-4 Visual) specifically defines video compression. MPEG-4 Visual includes the concepts of a video object and a video object plane. A video object is an entity in a scene that a user can access and manipulate. The instances of video objects at a given time are called video object planes (VOPs). The encoding process generates a coded representation of a VOP plus composition information necessary for display. At the decoder, a user may interact with and modify the composition process as needed.

In MPEG-4 Visual, a video object may be an entire frame or a portion of a frame and may be coded as an arbitrary shape. An MPEG-4 bitstream may include three major types of VOPs, intracoded VOPs (I-VOPs), predictive coded VOPs (P-VOPS), and bi-directionally coded VOPs (B-VOPs). I-VOPs are coded with moderate compression and without reference to other pictures. I-VOPs must appear regularly in the bitstream as they are required for decoding of subsequent VOPs. P-VOPs are coded more efficiently, i.e., using motion compensated prediction from past intra or predictive coded VOPs, and are generally used as a reference for further prediction. B-VOPs provide the highest degree of compression but require both past and future reference VOPs for motion compensation. All VOPs consist of macroblocks. A macroblock is 16×16 pixels in the luminance space and 8×8 pixels in the chrominance space for the simplest sub-sampling format.

To aid in error localization, MPEG-4 Visual includes a video packet mode in which frames of video are encoded as video packets that each start with a unique resynchronization marker, referred to in the standard as a resync_marker. When in video packet mode, an encoder inserts resynchronization markers in the video bitstream at approximately fixed intervals. The locations of the resynchronization markers are based on the number of macroblocks required to form a packet with a desired bit length. This allows more resynchronization markers to be inserted in high activity portions of a video bitstream to help a decoder in localizing and recovering from errors. In general, as a decoder receives the encoded bitstream, the decoder attempt to detect any errors in the packets. When an error is detected, the decoder looks forward in the bitstream for the next resynchronization marker, which indicates where the next video packet in the bitstream begins. The decoder is then able to begin decoding this next video packet. Accordingly, the detection of these resynchronization markers in the decoder is important.

Resynchronization markers in the bitstream can vary in length. In general, a resynchronization marker is a byte-aligned binary number having 16-22 zeros followed by a one. More specifically, the length of a resynchronization marker is determined by the type of the VOP in which the resynchronization marker occurs. If the VOP is an I-VOP, the resynchronization markers in the I-VOP are 17 bits in length (16 zeros followed by a one). If the VOP is a P-VOP, the length of the resynchronization markers in the P-VOP is 16 plus the value of an fcode in the P-VOP header, i.e., vop_fcode_forward. An fcode is a 3-bit unsigned integer taking values from 1 to 7 and specifies a motion-vector search range for a VOP. For example, if the value of the fcode is 2, the resynchronization markers in the P-VOP are 18 bits in length (17 zeros followed by a one).

If the VOP is a B-VOP, the length of the resynchronization markers in the B-VOP may vary based on the version of MPEG-4 Visual used by the encoder in coding the bitstream. If version one of MPEG-4 Visual, released in 1999, is used by the encoder, the length of the resynchronization markers in the B-VOP is 16 plus the value of the larger of two fcodes in the B-VOP header, i.e., vop_fcode_forward and vop_fcode_backward. For example, if the value of vop_fcode_forward is 1 and the value of vop_fcode_backward is 3, the resynchronization markers in the B-VOP are 19 bits in length (18 zeros followed by a one). Note that the minimum length of a resynchronization marker in a B-VOP using this definition is 17 and the maximum length is 23.

If either version two or version three of MPEG-4 Visual, released in 2001 and 2004 respectively, is used by the encoder, the length of the resynchronization markers in the B-VOP is 18 if the value of the larger of the two fcodes is 1 or 2, and is 16 plus the value of the larger of the two fcodes otherwise. For example, if the value of vop_fcode_forward is 1 and the value of vop_fcode_backward is 1, the resynchronization markers in the B-VOP are 18 bits in length (17 zeros followed by a one). And, if the value of vop_fcode_forward is 4 and the value of vop_fcode_backward is 3, the resynchronization markers in the B-VOP are 20 bits in length (19 zeros followed by a one). Note that the minimum length of a resynchronization marker in a B-VOP using this definition is 18 and the maximum length is 23.

In commercial applications, it is desirable for a decoder to be able to decode bitstreams encoded using any of the three versions of MPEG-4 Visual. A known solution for the issue of handling the two definitions for the resynchronization marker length for a B-VOP among the versions is to implement separate functions for resynchronization marker detection in a decoder to handle each of the two definitions and provide a flag that is set prior to submitting a bitstream to the decoder to indicate which version of MPEG-4 Visual was used in coding the bitstream. The decoder then checks the flag and selects the appropriate resynchronization marker detection function during decoding.

SUMMARY OF THE INVENTION

In general, the invention relates to a method for detecting a resynchronization marker in an encoded MPEG-4 video bitstream and a decoder and digital system configured to execute the method. The method includes at each macroblock boundary in a video object plane (VOP) in the video bitstream, computing a first candidate resynchronization marker length based on a first version of MPEG-4 Visual and a type of the VOP, computing a second candidate resynchronization marker length based on a second version of MPEG-4 Visual and the type of the VOP, checking the video bitstream for a first valid resynchronization marker bit sequence using the first candidate resynchronization marker length, checking the video bitstream for a second valid resynchronization marker bit sequence using the second candidate resynchronization marker length, and detecting the resynchronization marker when a valid sequence of stuffing bits is present in the video bitstream after the macroblock boundary and either the first valid resynchronization marker bit sequence or the second valid resynchronization marker bit sequence is found in the video bitstream.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
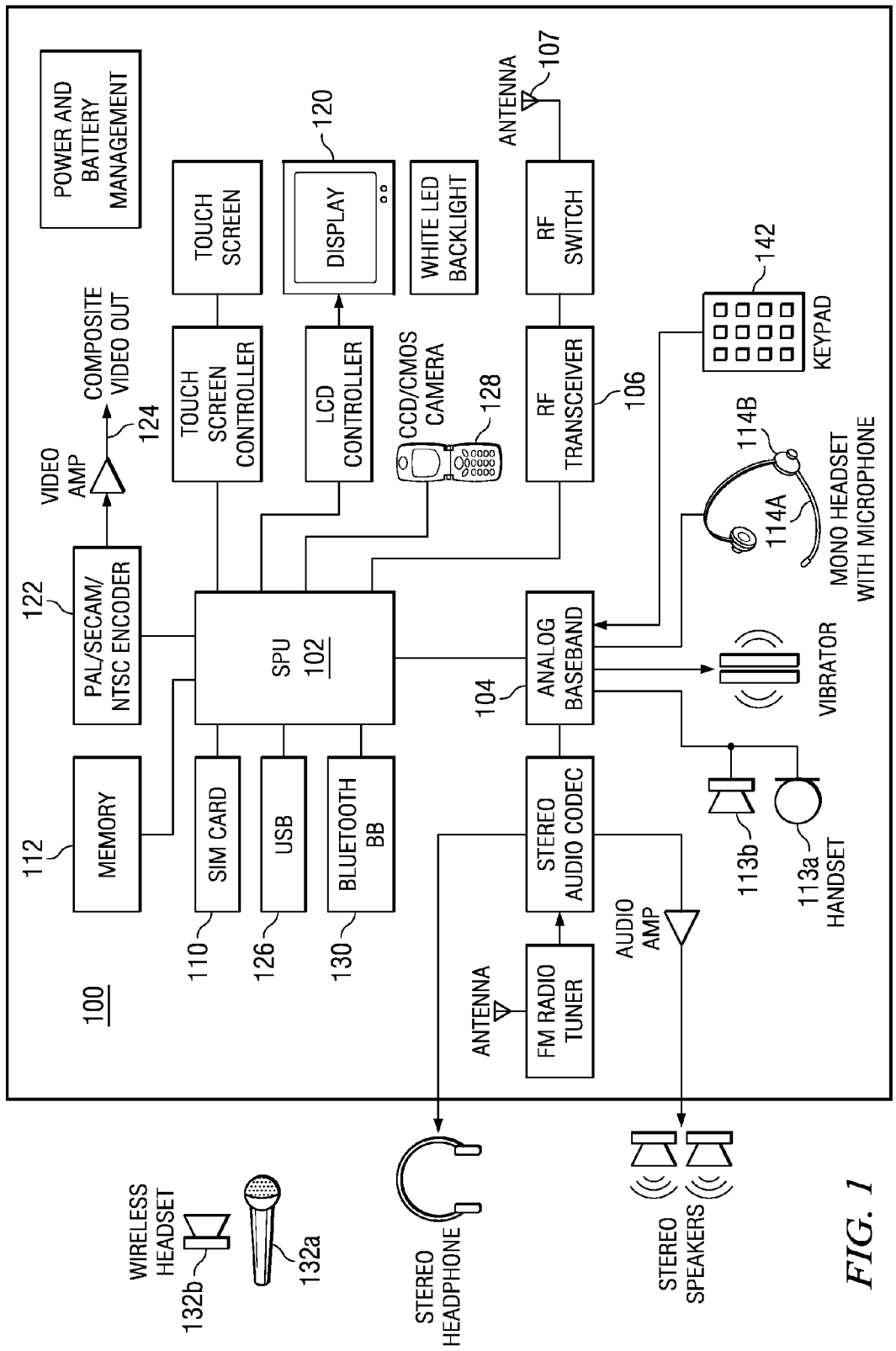
FIG. 1 shows a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, pseudo code expressed in the C programming language is presented for only purposes of describing embodiments of a method and should not be construed to limit the scope of the claimed invention.

In general, embodiments of the invention provide methods for detecting a resynchronization marker during decoding an MPEG-4 video bitstream, and decoders and digital systems configured to use the method. More specifically, in one or more embodiments of the invention, the methods provide for the detection of resynchronization markers with lengths as defined in each of the previously mentioned versions of MPEG-4 Visual without requiring knowledge of the version used to encode the video bitstream.

FIG. 1 is a block diagram of a digital system (e.g., a mobile cellular telephone) (100) that may be configured to perform embodiments of the method for detecting a resynchronization marker in an MPEG-4 video bitstream described herein. The signal processing unit (SPU) (102) includes a digital processing processor system (DSP) that includes embedded memory and security features. The analog baseband unit (104) receives a voice data stream from handset microphone (113a) and sends a voice data stream to the handset mono speaker (113b). The analog baseband unit (104) also receives a voice data stream from the microphone (114a) and sends a voice data stream to the mono headset (114b). The analog baseband unit (104) and the SPU (102) may be separate ICs. In many embodiments, the analog baseband unit (104) does not embed a programmable processor core, but performs processing based on configuration of audio paths, filters, gains, etc being setup by software running on the SPU (102). In some embodiments, the analog baseband processing is performed on the same processor and can send information to it for interaction with a user of the digital system (100) during a call processing or other processing.

The display (120) may display digital images and video bitstreams received from a network, from a local camera (128), or from other sources such as the USB (126) or the memory (112). The SPU (102) may also send a video bitstream to the display (120) that is received from various sources such as a cellular network via the RF transceiver (106) or the camera (126). The SPU (102) may also send a video bitstream to an external video display unit via the encoder (122) over a composite output terminal (124). The encoder unit (122) may provide encoding according to PAL/SECAM/NTSC video standards.

The SPU (102) includes functionality to perform the computational operations required for video compression and decompression. The video compression standards supported may include, for example, one or more of the JPEG standards, the MPEG standards, and the H.26x standards. In one or more embodiments of the invention, the SPU (102) is configured to perform the computational operations of embodiments of the method for detecting a resynchronization marker in an encoded MPEG-4 video bitstream described herein. Software instructions implementing the method may be stored in the memory (112) and executed by the SPU (102) during decoding of video bitstreams.

Figure 2:
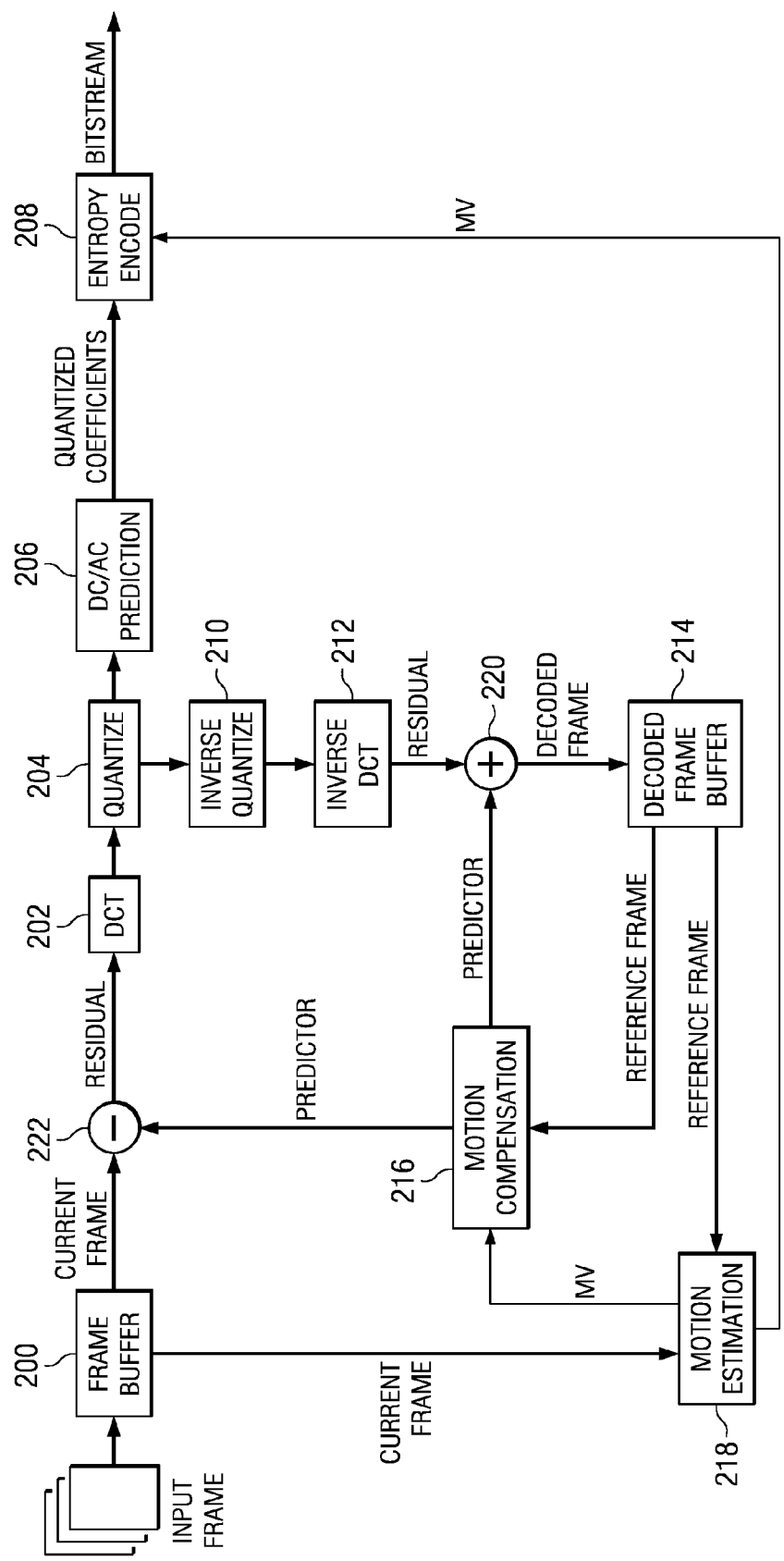
FIG. 2 shows a block diagram of a video encoder in accordance with one or more embodiments of the invention.

FIG. 2 shows a block diagram of a video encoder in accordance with one or more embodiments of the invention. More specifically, FIG. 2 shows the basic coding architecture of an MPEG-4 video encoder. In one or more embodiments of the invention, the video encoder produces video bitstreams that include resynchronization markers conforming to one or more of the previously mentioned versions of MPEG-4 Visual. In one or more embodiments of the invention, this architecture may be implemented in hardware and/or software on the digital system of FIG. 1.

In the video encoder of FIG. 2, input frames for encoding are read from a frame buffer (200) and provided as one input of a motion estimation component (218) and to a combiner (222) (e.g., adder or subtractor or the like). The decoded frame storage component (214) provides reference data to the motion estimation component (218) and to the motion compensation component (216). The reference data may include one or more previously encoded and decoded frames. The motion estimation component (218) provides motion estimation information to the motion compensation component (216) and the entropy encode component (208). Specifically, the motion estimation component (218) provides the selected motion vector (MV) or vectors to the motion compensation component (216) and the entropy encode component (208). The motion compensation component (216) provides motion compensated prediction information to a combiner (220) that includes motion compensated interframe macroblocks. The intraframe prediction component also provides intraframe prediction information to the combiner (222) that includes intraframe prediction macroblocks.

The combiner (222) provides a residual macroblock to the DCT component (202). The DCT component (202) performs a block transform, e.g., DCT, and outputs the transform result. The transform result is provided to a quantize component (204) which outputs quantized transform coefficients. The quantized transform coefficients are provided to the DC/AC (Discrete Coefficient/Alternative Coefficient) prediction component (206). AC is typically defined as a DCT coefficient for which the frequency in one or both dimensions is non-zero (higher frequency). DC is typically defined as a DCT coefficient for which the frequency is zero (low frequency) in both dimensions. The DC/AC prediction component (206) predicts the AC and DC for the current macroblock based on AC and DC values of adjacent macroblocks such as an adjacent left top macroblock, a top macroblock, and an adjacent left macroblock. More specifically, the DC/AC prediction component (206) calculates predictor coefficients from quantized coefficients of neighboring macroblocks and then outputs the differentiation of the quantized coefficients of the current macroblock and the predictor coefficients. The differentiation of the quantized coefficients is provided to the entropy encode component (208), which encodes them and provides a compressed video bitstream for transmission or storage.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, the quantized transform coefficients from the quantize component (204) are provided to an inverse quantize component (210) which outputs estimated transformed information, i.e., an estimated or reconstructed version of the transform result from the DCT component (202). The estimated transformed information is provided to the inverse DCT component (212), which outputs estimated residual information which represents a reconstructed version of the residual macroblock. The reconstructed residual macroblock is provided to the combiner (220). The combiner (220) adds the predicted macroblock form the motion compensation component (216) to the reconstructed residual macroblock to generate an unfiltered reconstructed macroblock, which becomes part of reconstructed frame information. The reconstructed frame information, i.e., reference frame, is stored in the decoded frame buffer component (214) which provides the reconstructed frame information as reference frames to the motion estimation component (218) and the motion compensation component (216).

Figure 3:
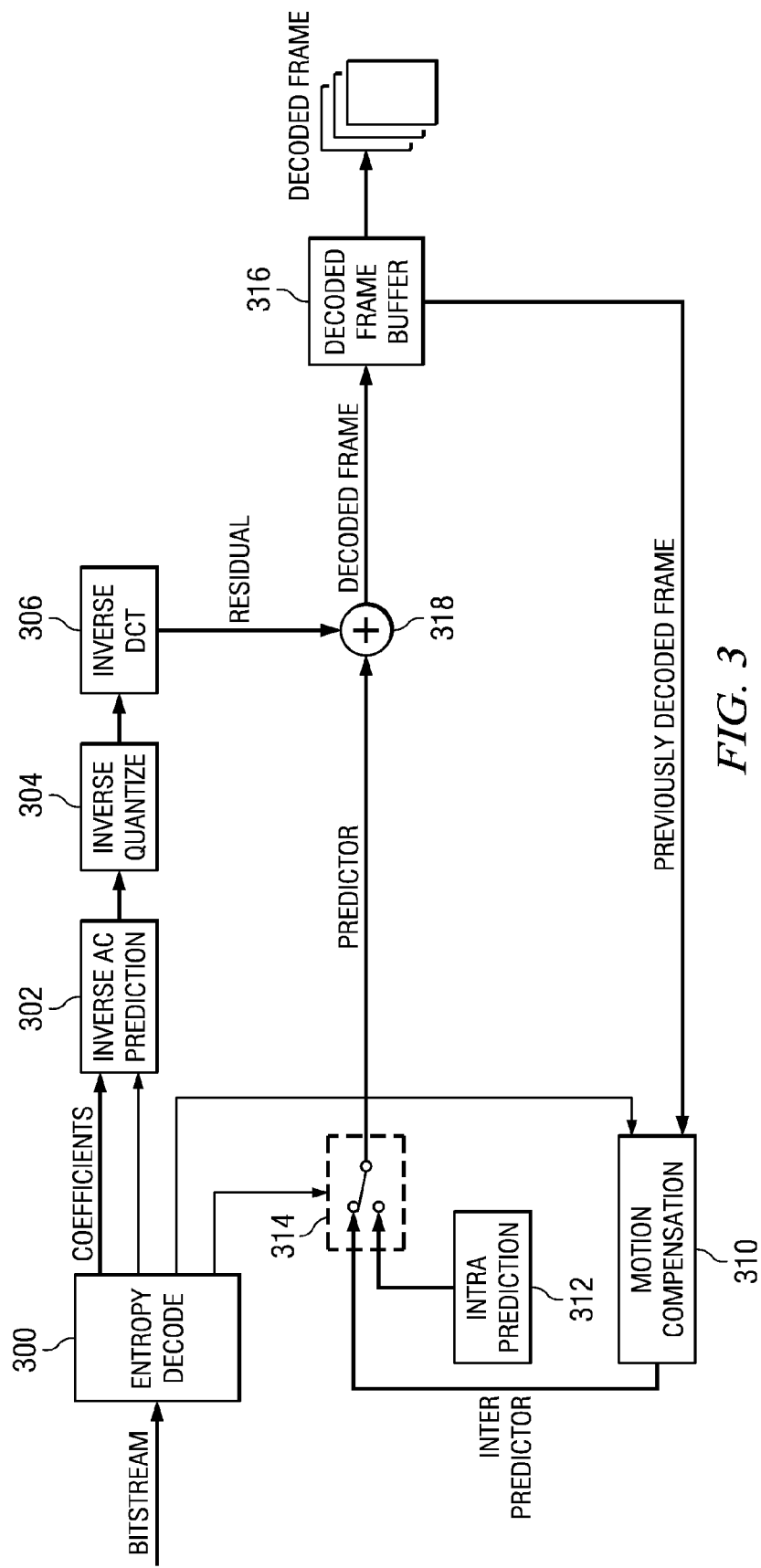
FIG. 3 shows a block diagram of a video decoder in accordance with one or more embodiments of the invention.

FIG. 3 shows a block diagram of a video decoder in accordance with one or more embodiments of the invention. More specifically, FIG. 3 shows the basic decoding architecture of an MPEG-4 video decoder. In one or more embodiments of the invention, the video decoder is configured to perform the method for detecting a resynchronization marker described herein. More specifically, in one or more embodiments of the invention, the video decoder is configured to decode video bitstreams that include resynchronization markers conforming any of the previously mentioned versions of MPEG-4 Visual without knowledge of the version of the standard used by an encoder to encode a bitstream. In one or more embodiments of the invention, this architecture may be implemented in hardware and/or software on the digital system of FIG. 1.

The entropy decode component (300) receives an encoded video bitstream and recovers the symbols from the entropy encoding performed by the encoder. In one or more embodiments of the invention, a method for detecting a resynchronization marker is performed as part of the entropy decoding performed by the entropy decode component 300. The entropy decode component (300) performs inverse DC predictions and provides coefficients to the inverse AC prediction component (302). The entropy decode component (300) also sends motion vectors to the motion compensation component (310) and a macroblock type indicating intra or inter prediction to the switch (314). The inverse AC prediction component (302) performs inverse AC prediction and provides the resulting coefficients to the inverse quantize component (304). The inverse quantize component (304) assembles the macroblocks in the video bitstream in raster scan order and substantially recovers the original frequency domain data. This frequency domain data is provided to the inverse DCT component (306). The inverse DCT component (306) transforms the frequency domain data from the inverse quantize component (304) back to the spatial domain. This spatial domain data, i.e., residual, supplies one input of the combiner (318).

The other input of the combiner (318), i.e., the predictor, comes from the switch (314). When inter prediction is signaled in the encoded video bitstream, the macroblock mode switch (314) selects the output of the motion compensation component (310). The motion compensation component (310) receives reference frames from frame storage (316) and applies the motion compensation computed by the encoder and transmitted in the encoded video bitstream. When intra prediction mode is signaled in the encoded video stream, the switch (314) selects the output of the intra prediction component (314). The intra prediction component (312) applies the intra prediction computed by the encoder and transmitted in the encoded video bitstream. The combiner (318) recovers the predicted frame. The output of the combiner (318) is the decoded frame. Each decoded frame is stored in the decoded frame buffer component (316) to be used as a reference frame by the motion compensation component (310).

Figure 4:
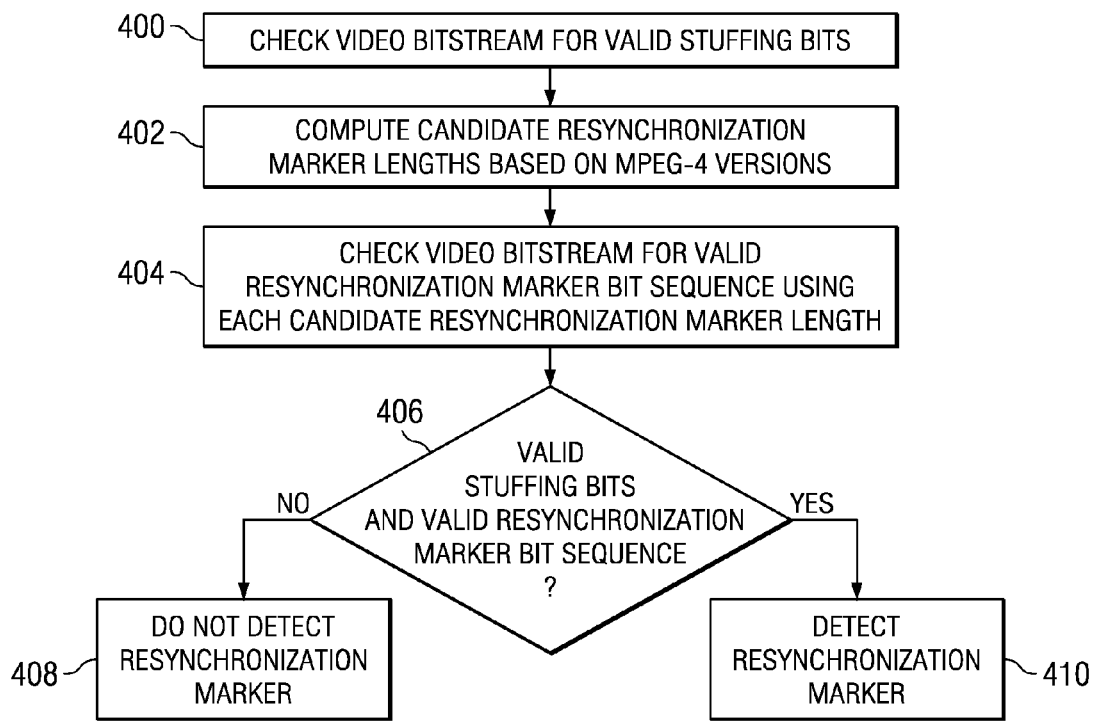
FIG. 4 shows a flow diagram of a method for detecting a resynchronization marker in an encoded MPEG-4 video bitstream in accordance with one or more embodiments of the invention.

FIG. 4 is a flow diagram of a method for detecting a resynchronization marker in an encoded MPEG-4 video bitstream in accordance with one or more embodiments of the invention. More specifically, the method detects a resynchronization marker inserted after a macroblock in a B-VOP in an MPEG-4 video bitstream encoded using any of the previously mentioned versions of the MPEG-4 Visual standard without requiring any indication of which version of the standard was used by the encoder. As previously discussed, the expected length of a resynchronization marker occurring after a macroblock in a B-VOP may vary depending upon which version of the MPEG-4 Visual standard is used by an encoder.

In one or more embodiments of the invention, the method of FIG. 4 is performed in a decoder at each macroblock boundary of a B-VOP in a video bitstream. Further, the method is only performed at macroblock boundaries to avoid emulation of a 17-bit resynchronization marker, i.e., the shortest resynchronization marker permitted in version one of MPEG-4 Visual. Without this restriction, some combinations of variable length coded (VLC) words allowed by MPEG-4 Visual could be falsely detected as a 17-bit resynchronization marker and cause an undesired resynchronization in the video bitstream. Table 1 shows an example of one such combination of VLC words obtainable from decoding a macroblock of a B-VOP. In this example, the bit sequence in bold emulates a 17-bit resynchronization marker.

TABLE 1

| Parameter Name | Code |
| --- | --- |
| MODB | 00 |
| MB_TYPE | 0001 |
| CBPB | 1000 00 |
| DBQUANT | 0 |
| motion vector VLC word | 0000 0000 0011 1 |

In the method of FIG. 4, initially the video bitstream is checked for a valid sequence of stuffing bits (400). As previously stated, a resynchronization marker is required to be byte-aligned. During encoding, when a resynchronization marker is to be inserted in the bitstream following an encoded macroblock, the encoder inserts stuffing bits in the bitstream to force the resynchronization marker to begin at the next byte boundary following the encoded macroblock. The number and values of the stuffing bits inserted depends on how many bits are left in the last byte of the encoded macroblock. Table 2 shows the stuffing bit sequences for each possible number of bits remaining in the last byte of the encoded macroblock.

TABLE 2

| Number of bits remaining | Stuffing Bit Sequence |
| --- | --- |
| 0 | 01111111 |
| 1 | 0 |
| 2 | 01 |
| 3 | 011 |
| 4 | 0111 |
| 5 | 01111 |
| 6 | 011111 |
| 7 | 0111111 |

Candidate resynchronization marker lengths are also computed based on each of the MPEG-4 Visual versions (402). In one or more embodiments of the invention, two candidate resynchronization marker lengths are computed, one conforming to version one of MPEG-4 Visual and one conforming to versions two and three of the standard. Accordingly, one candidate resynchronization marker length is calculated as 16 plus the value of the larger of two fcodes in the B-VOP header, i.e., vop_fcode_forward and vop_fcode_backward, for version one of the standard. The other candidate resynchronization marker length is calculated as 18 if the value of the larger of the two fcodes is 1 or 2, and as 16 plus the value of the larger of the two fcodes otherwise. For example, if both vop_fcode_forward and vop_fcode_backward are 1, the two candidate resynchronization marker lengths would be 17 and 18, respectively. In one or more embodiments of the invention, if other versions of the MPEG-4 Visual define other permissible lengths for the resynchronization marker, additional candidate resynchronization marker lengths are computed.

The video bitstream is then checked for a valid resynchronization marker bit sequence using each of the computed candidate resynchronization marker lengths (404). In one or more embodiments of the invention, the checks may be performed in parallel. If a valid sequence of stuffing bits was found in the bitstream and a valid resynchronization marker bit sequence using at least one of the candidate resynchronization marker lengths is found in the bitstream after the sequence of stuffing bits (406), a resynchronization marker is detected (410). If a valid sequence of stuffing bits was not found and/or a valid resynchronization marker bit sequence was not found (406), a resynchronization marker is not detected (408). In one or more embodiments of the invention, if a resynchronization marker is detected, processing related to detection of a resynchronization marker is performed and decoding of the video bitstream continues at the bit in the bitstream following the detected resynchronization marker. And, if a resynchronization is not detected, decoding continues at the bit in the bitstream immediately following the encoded macroblock.

Table 3, provided at the end of this description, is a pseudo code description of a method for detecting resynchronization markers in an encoded MPEG-4 video bitstream in accordance with one or more embodiments of the invention. More specifically, the method detects resynchronization markers inserted after a macroblock in any type of VOP, i.e., an I-VOP, a P-VOP, or a B-VOP, in an MPEG-4 video bitstream encoded using any of the previously mentioned versions of the MPEG-4 Visual standard without requiring any indication of which version of the standard was used by the encoder. As previously discussed, the expected length of a resynchronization marker occurring after a macroblock in a B-VOP may vary depending upon which version of the MPEG-4 Visual standard is used by an encoder and the expected length of a resynchronization marker occurring after a macroblock in an I-VOP or a P-VOP is the same for all versions.

In one or more embodiments of the invention, the method expressed by the pseudo code of Table 3 is performed in a decoder at each macroblock boundary in a video bitstream. Further, the method is only performed at macroblock boundaries to avoid emulation of a 17-bit resynchronization marker, i.e., the shortest resynchronization marker permitted in version one of MPEG-4 Visual. As previously discussed, without this restriction, some combinations of variable length coded (VLC) words allowed by MPEG-4 Visual could be falsely detected as a 17-bit resynchronization marker and cause an undesired resynchronization in the video bitstream.

Lines 1-11 in Table 3 define a number of variables used in following code. Their definitions should be apparent from the description of the code. Initially, the encoded video bitstream is checked for a sequence of valid stuffing bits (lines 12-51). As previously discussed, resynchronization markers must occur on byte boundaries. Therefore, an encoder inserts sufficient stuffing bits in a video bitstream at the end of an encoded macroblock to force a resynchronization marker to begin on a byte boundary. Further, if the encoded macroblock ends on a byte boundary, the encoder inserts a sequence of eight stuffing bits in the bitstream. Table 1 above shows the possible valid stuffing bit sequences.

To check for a sequence of valid stuffing bits, the number of bits remaining in a current byte, length_to_bytealign, is determined (line 13) by a function, get_num_bits_left_in_byte, that returns the number of bits left in the byte. If the number of bits left in the byte is zero, then length_to_bytealign is set to eight to allow for an eight bit sequence of valid stuffing bits (line 14). A sequence of bits, next_bits, of the length specified by length_to_bytealign is then read from the video bitstream (line 17) and tested for validity (lines 18-51). Note that a flag, valid_stuffing_bits, is set to indicate whether or not a valid sequence of stuffing bits was found.

Next, an array of candidate resynchronization marker lengths, resync_marker_len, is filled with candidate lengths for a resynchronization marker based on the type of the VOP (lines 54-73). One candidate length, resync_marker_len[0], is computed based on the definition of a resynchronization marker for the VOP type in versions two and three of MPEG-4 Visual and the other candidate length, resync_marker_len[1], is computed based on the definition of a resynchronization marker for the VOP type in the version one of MPEG-4 Visual. In one or more embodiments of the invention, if other versions of MPEG-4 Visual include different definitions for a resynchronization marker for a VOP type, the array of candidate resynchronization marker lengths is increased in size to include the additional definitions. Note that this method can handle variations in the definition of a resynchronization marker for all VOP types, not just for a B_VOP.

Once the candidate resynchronization marker lengths are computed, the video bitstream is checked for a valid resynchronization marker bit sequence using each of the computed candidate resynchronization marker lengths (lines 74-82). The function m_util.ecd_word_mask referenced in line 79 extracts a range of bits of the size specified in the second and third parameters from the first parameter. Note that a flag, valid_resync_marker[i], is set to indicate whether or not a valid resynchronization marker bit sequence was found for a candidate resynchronization marker length. In one or more embodiments of the invention, checking of the bitstream with the candidate resynchronization marker lengths is performed in parallel.

A test is then performed to see if both a sequence of valid stuffing bits and a valid resynchronization marker bit sequence were found (lines 85-86). If both were found, a resynchronization marker is detected (lines 87-95) and if both were not found, a resynchronization marker is not detected (line 96).

Figure 5:
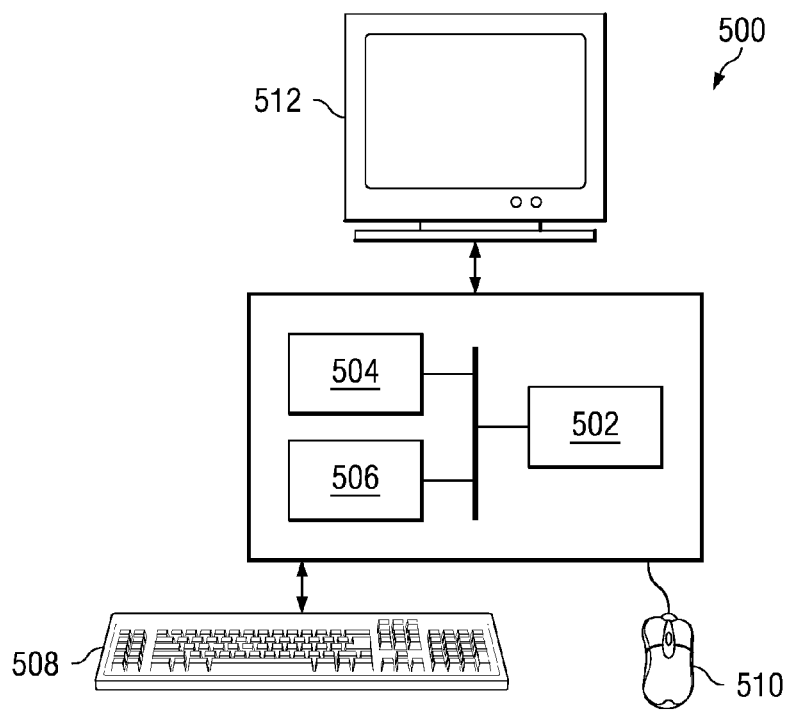
FIG. 5 shows an illustrative digital system in accordance with one or more embodiments.

Embodiments of the methods and systems for video decoding described herein may be implemented for virtually any type of digital system (e.g., a desk top computer, a laptop computer, a handheld device such as a mobile (i.e., cellular) phone, a personal digital assistant, a digital camera, a set top box, etc.) with functionality to display video sequences. For example, as shown in FIG. 5, a digital system (500) includes a processor (502), associated memory (504), a storage device (506), and numerous other elements and functionalities typical of today's digital systems (not shown). In one or more embodiments of the invention, a digital system may include multiple processors and/or one or more of the processors may be digital signal processors. The digital system (500) may also include input means, such as a keyboard (508) and a mouse (510) (or other cursor control device), and output means, such as a monitor (512) (or other display device). The digital system ((500)) may also include an image capture device (not shown) that includes circuitry (e.g., optics, a sensor, readout electronics) for capturing digital images and video sequences. The digital system (500) may be connected to a network (514) (e.g., a local area network (LAN), a wide area network (WAN) such as the Internet, a cellular network, any other similar type of network and/or any combination thereof) via a network interface connection (not shown). Encoded video sequences may be received over the network and/or read from a storage device (506), decoded using the method for decoding described herein, and displayed on the display device (512). Those skilled in the art will appreciate that these input and output means may take other forms.

Further, those skilled in the art will appreciate that one or more elements of the aforementioned digital system (500) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, or any other computer readable storage device. The software instructions may be distributed to the digital system (500) via removable memory (e.g., floppy disk, optical disk, flash memory, USB key), via a transmission path (e.g., applet code, a browser plug-in, a downloadable standalone program, a dynamically-linked processing library, a statically-linked library, a shared library, compilable source code), etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

TABLE 3

```
1   {   int i;
2       U3 status;
3       U32 length_to_bytealign;
4       U32 next_bits;
5       U1 valid_stuffing_bits;
6       U1 valid_resync_marker[2];
7       U1 valid_start_code;
8       U3 fcode;
9       U32 resync_marker_len[2]; //array of candidate resync_marker lengths
10      U32 resync_marker_len_sel; // selected resynchronization marker
11      U32 resync_marker_val;
12      // determine how much bits are remaining in the current byte
13      length_to_bytealign = cdcif->get_num_bits_left_in_byte( );
```

TABLE 3-continued

```
14    if (length_to_bytealign == 0) { length_to_bytealign = 8; }
15    // To check for valid stuffing bits, the remaining bits in the current byte are read
16    // The number of bits to read is "length_to_bytealign"
17    next_bits = test_bits((U8)length_to_bytealign);
18    // Check if the stuffing bits are valid or not
19    switch (length_to_bytealign) {
20    case 8:
21      if (next_bits == 0x7f) { valid_stuffing_bits = 1; }
22      else { valid_stuffing_bits = 0; }
23      break;
24    case 1:
25      if (next_bits == 0x00) { valid_stuffing_bits = 1; }
26      else { valid_stuffing_bits = 0; }
27      break;
28    case 2:
29      if (next_bits == 0x01) { valid_stuffing_bits = 1; }
30      else { valid_stuffing_bits = 0; }
31      break;
32    case 3:
33      if (next_bits == 0x03) { valid_stuffing_bits = 1; }
34      else {valid_stuffing_bits = 0; }
35      break;
36    case 4:
37      if (next_bits == 0x07) { valid_stuffing_bits = 1; }
38      else { valid_stuffing_bits = 0; }
39      break;
40    case 5:
41      if (next_bits == 0x0f) { valid_stuffing_bits = 1; }
42      else { valid_stuffing_bits = 0; }
43      break;
44    case 6:
45      if (next_bits == 0x1f) { valid_stuffing_bits = 1; }
46      else { valid_stuffing_bits = 0; }
47      break;
48    default: //case 7:
49      if (next_bits == 0x3f) { valid_stuffing_bits = 1; }
50      else { valid_stuffing_bits = 0; }
51      break; }
52    // Check for a resync_marker
53    resync_marker_val = 1;
54    assert( (vop_coding_type == I_VOP) ||
55            (vop_coding_type == P_VOP) ||
56            (vop_coding_type == B_VOP) );
57    switch (vop_coding_type) {
58    case I_VOP:
59      resync_marker_len[0] = 17;
60      resync_marker_len[1] = resync_marker_len[0];
61      break;
62    case P_VOP:
63      resync_marker_len[0] = vop_fcode_forward + 16;
64      resync_marker_len[1] = resync_marker_len[0];
65      break;
66    case B_VOP:
67    default:
68      if (vop_fcode_forward > vop_fcode_backward) {
69         fcode = vop_fcode_forward }
70      else { fcode = vop_fcode_backward; }
71      resync_marker_len[0] = (15 + fcode > 17) ? 16 + fcode : 18;
72      resync_marker_len[1] = 16 + fcode;
73      break; }
74    // Check bitstream after stuffing bits for a resync_marker using
75    // each resync_marker_len
76    for (i = 0; i < 2; ++i) {
77      // Look bitstream w/ the length
78      next_bits = test_bits((U8)(length_to_bytealign + resync_marker_len[i]));
79      if (m_util.ecd_word_mask(next_bits, (U8)(resync_marker_len[i] − 1), 0) ==
80            resync_marker_val) {
81         valid_resync_marker[i] = 1; }
82      else { valid_resync_marker[i] = 0; } }
83    // If a resync_marker of either length is found, and the stuffing bits are valid, assume
84    // a resync_marker is detected.
85    if (((valid_resync_marker[0] == 1) || (valid_resync_marker[1] == 1))
86         && (valid_stuffing_bits == 1)) {
87      if (valid_resync_marker[0] == 1) {
88         resync_marker_len_sel = resync_marker_len[0];
89         *out_err_pkt_resync_marker = 0; }
90      else {
91         resync_marker_len_sel = resync_marker_len[1];
92         *out_err_pkt_resync_marker = 1; }
93      // Jump the current bit pointer by the size of resync_marker size
```

TABLE 3-continued

| | |
|---|---|
| 94 | cdcif->get_bits((U8)(length_to_bytealign + resync_marker_len_sel)); |
| 95 | status = END_MP4_RESYNC; } |
| 96 | else { status = END_DEFAULT; } } |

What is claimed is:

1. A method of detecting a resynchronization marker in an encoded MPEG-4 video bitstream, the method comprising:
at a macroblock boundary between first and second video packets in a video object plane (VOP) in the video bitstream, checking the video bitstream for a valid sequence of stuffing bits, wherein the VOP is a bi-directionally coded type of VOP;
based on the VOP being the bi-directionally coded type of VOP, computing a first candidate resynchronization marker length for the second video packet based on a first version of MPEG-4 Visual;
based on the VOP being the bi-directionally coded type of VOP, computing a second candidate resynchronization marker length for the second video packet based on a second version of MPEG-4 Visual;
in the second video packet, checking the video bitstream for a first valid resynchronization marker bit sequence having the first candidate resynchronization marker length;
in the second video packet, checking the video bitstream for a second valid resynchronization marker bit sequence having the second candidate resynchronization marker length; and
without an indication of which of the first and second versions of MPEG-4 Visual was used for encoding the video bitstream, detecting the resynchronization marker in the second video packet, in response to detecting: the valid sequence of stuffing bits in the video bitstream; and one of the first and second valid resynchronization marker bit sequences in the second video packet.

2. The method of claim 1, wherein computing a first candidate resynchronization marker length and computing a second candidate resynchronization marker length are performed in parallel.

3. The method of claim 1, wherein the first version is version two or version three of MPEG-4 Visual, and the second version is version one of MPEG-4 Visual.

4. The method of claim 1, wherein:
computing a first candidate resynchronization marker length comprises:
computing the first candidate resynchronization marker length as eighteen when a value of an fcode is less than three; and
computing the first candidate resynchronization marker length as a sum of sixteen plus the value of the fcode when the value of the fcode is greater than or equal to three; and
computing a second candidate resynchronization marker length comprises:
computing the second candidate resynchronization marker length as a sum of sixteen plus the value of the fcode;
wherein the value of the fcode is the larger of vop_fcode_ backward and vop_fcode_forward.

5. A video decoder for decoding an encoded MPEG-4 video bitstream, wherein the decoding comprises detecting a resynchronization marker in the encoded MPEG-4 video bitstream, and wherein the detecting comprises:
at a macroblock boundary between first and second video packets in a video object plane (VOP) in the video bitstream, checking the video bitstream for a valid sequence of stuffing bits, wherein the VOP is a bi-directionally coded type of VOP;
based on the VOP being the bi-directionally coded type of VOP, computing a first candidate resynchronization marker length for the second video packet based on a first version of MPEG-4 Visual;
based on the VOP being the bi-directionally coded type of VOP, computing a second candidate resynchronization marker length for the second video packet based on a second version of MPEG-4 Visual;
in the second video packet, checking the video bitstream for a first valid resynchronization marker bit sequence having the first candidate resynchronization marker length;
in the second video packet, checking the video bitstream for a second valid resynchronization marker bit sequence having the second candidate resynchronization marker length; and
without an indication of which of the first and second versions of MPEG-4 Visual was used for encoding the video bitstream, detecting the resynchronization marker in the second video packet, in response to detecting: the valid sequence of stuffing bits in the video bitstream; and one of the first and second valid resynchronization marker bit sequences in the second video packet.

6. The video decoder of claim 5, wherein computing a first candidate resynchronization marker length and computing a second candidate resynchronization marker length are performed in parallel.

7. The video decoder of claim 5, wherein the first version is version two or version three of MPEG-4 Visual, and the second version is version one of MPEG-4 Visual.

8. The video decoder of claim 5, wherein:
computing a first candidate resynchronization marker length comprises:
computing the first candidate resynchronization marker length as eighteen when a value of an fcode is less than three; and
computing the first candidate resynchronization marker length as a sum of sixteen plus the value of the fcode when the value of the fcode is greater than or equal to three; and
computing a second candidate resynchronization marker length comprises:
computing the second candidate resynchronization marker length as a sum of sixteen plus the value of the fcode;
wherein the value of the fcode is the larger of vop_fcode_ backward and vop_fcode_forward.

9. A system, comprising:
at least one processor; and
at least one memory storing instructions executable by the processor for detecting a resynchronization marker in an encoded MPEG-4 video bitstream, wherein the detecting comprises:
at a macroblock boundary between first and second video packets in a video object plane (VOP) in the video bitstream, checking the video bitstream for a valid sequence of stuffing bits, wherein the VOP is a bi-directionally coded type of VOP;

based on the VOP being the bi-directionally coded type of VOP, computing a first candidate resynchronization marker length for the second video packet based on a first version of MPEG-4 Visual;

based on the VOP being the bi-directionally coded type of VOP, computing a second candidate resynchronization marker length for the second video packet based on a second version of MPEG-4 Visual;

in the second video packet, checking the video bitstream for a first valid resynchronization marker bit sequence having the first candidate resynchronization marker length;

in the second video packet, checking the video bitstream for a second valid resynchronization marker bit sequence having the second candidate resynchronization marker length; and without an indication of which of the first and second versions of MPEG-4 Visual was used for encoding the video bitstream, detecting the resynchronization marker in the second video packet, in response to detecting: the valid sequence of stuffing bits in the video bitstream; and one of the first and second valid resynchronization marker bit sequences in the second video packet.

10. The system of claim 9, wherein computing a first candidate resynchronization marker length and computing a second candidate resynchronization marker length are performed in parallel.

11. The system of claim 9, wherein the first version is version two or version three of MPEG-4 Visual, and the second version is version one of MPEG-4 Visual.

12. The system of claim 9, wherein:

computing a first candidate resynchronization marker length comprises:
  computing the first candidate resynchronization marker length as eighteen when a value of an fcode is less than three; and
  computing the first candidate resynchronization marker length as a sum of sixteen plus the value of the fcode when the value of the fcode is greater than or equal to three; and computing a second candidate resynchronization marker length comprises:
  computing the second candidate resynchronization marker length as a sum of sixteen plus the value of the fcode;
  wherein the value of the fcode is the larger of vop_fcode_ backward and vop_fcode_forward.

* * * * *